(12) United States Patent
Nimushakavi

(10) Patent No.: US 10,326,808 B2
(45) Date of Patent: Jun. 18, 2019

(54) CONTACT INFORMATION DISTRIBUTOR

(71) Applicant: International Business Machines Corporation, Armonk, NY (US)

(72) Inventor: Venkata Sai Karthik Nimushakavi, Secunderabad (IN)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 15/071,405

(22) Filed: Mar. 16, 2016

(65) Prior Publication Data

US 2017/0272393 A1   Sep. 21, 2017

(51) Int. Cl.
*G06F 15/16* (2006.01)
*H04L 29/06* (2006.01)
*H04L 12/18* (2006.01)
*H04L 29/08* (2006.01)

(52) U.S. Cl.
CPC ........ *H04L 65/403* (2013.01); *H04L 12/1822* (2013.01); *H04L 67/22* (2013.01)

(58) Field of Classification Search
CPC ....................................................... H04L 51/14
See application file for complete search history.

(56) References Cited

U.S. PATENT DOCUMENTS

| | | | | |
|---|---|---|---|---|
| 7,373,428 B1 * | 5/2008 | Armstrong | ............. | H04L 67/22 370/349 |
| 7,640,550 B1 * | 12/2009 | Goel | ............... | H04L 12/1818 707/999.003 |
| 7,739,210 B2 * | 6/2010 | Horvitz | ............... | G06Q 10/109 706/21 |
| 8,577,895 B2 | 11/2013 | Gupta et al. | | |
| 8,600,027 B1 * | 12/2013 | Doerr | ................... | H04M 3/565 379/202.01 |

(Continued)

OTHER PUBLICATIONS

Anonymous, "Method and System for Initiating a Conference Call during Non-availability of a Moderator of the Conference Call," an IP.com Prior Art Database Technical Disclosure, IP.com No. 000202108, http://ip.com/IPCOM/000202108, 3 pages.

(Continued)

*Primary Examiner* — Douglas B Blair
(74) *Attorney, Agent, or Firm* — Kristofer L. Haggerty

(57) ABSTRACT

A computer receives contact information associated with one or more users and stores said contact information in a database. The computer detects a conference call and determines which users are present at the conference call. The computer determines whether the users already share contact information with one another and, if not, the computer determines whether contact information of a user should be distributed based on recorded usage patterns. Based on determining that contact information of the user should not be distributed based on usage patterns, the computer is further capable of determining whether the user wishes to share contact information with other participating users via user input. Based on determining that the first user would like to share their contact information with other participating users, the computer provides the other participating users access to the contact information of the first user and records usage patterns detailing the conference call.

20 Claims, 4 Drawing Sheets

(56) References Cited

U.S. PATENT DOCUMENTS

| | | | | |
|---|---|---|---|---|
| 8,855,722 | B2* | 10/2014 | Hawkins | G06F 1/1632 |
| | | | | 455/415 |
| 9,014,679 | B2 | 4/2015 | Lobzakov et al. | |
| 2002/0065120 | A1* | 5/2002 | Lee | G07F 17/32 |
| | | | | 463/6 |
| 2003/0050977 | A1* | 3/2003 | Puthenkulam | H04L 67/104 |
| | | | | 709/204 |
| 2004/0028200 | A1* | 2/2004 | Carlson | H04M 3/382 |
| | | | | 379/201.01 |
| 2005/0143135 | A1* | 6/2005 | Brems | H04M 1/2745 |
| | | | | 455/564 |
| 2009/0077045 | A1* | 3/2009 | Kirchmeier | G06Q 10/06 |
| 2010/0030788 | A1 | 2/2010 | Chen et al. | |
| 2010/0131866 | A1* | 5/2010 | Nielsen | H04L 12/1822 |
| | | | | 715/758 |
| 2010/0157851 | A1* | 6/2010 | Farah | H04M 3/42008 |
| | | | | 370/260 |
| 2014/0051383 | A1* | 2/2014 | Doerr | H04W 4/16 |
| | | | | 455/405 |
| 2014/0270126 | A1* | 9/2014 | Torgersrud | H04M 3/38 |
| | | | | 379/189 |

OTHER PUBLICATIONS

IBM, "IBM Lotus Notes 8 Recent Contacts and Type-ahead features: FAQs and more," IBM Notes and Domino wiki: Learning Lotus Notes clients: IBM Lotus Notes 8 Recent, https://www-10.lotus.com/ldd/dominowiki.nsf/dx/ibm-lotus-notes-8-recent-contacts-and-type-ahead-features-faqs, 8 pgs., printed Mar. 15, 2016.

* cited by examiner

CONTACT INFORMATION DISTRIBUTOR

BACKGROUND

The present invention relates generally to user contact information, and more particularly to distributing user contact information during a multi-person conference call. Conference calls often requires a host to connect with multiple individuals. In some cases, particularly in leisure, the host may be an individual utilizing methods such as three way calling to merge two phone calls together. In other cases, and particularly in business, conference calls may be hosted using a client-server system in which participating users, or clients, contact a central server which then retransmits communications received from participating users. In either case, utilizing a host generally requires each participant need only know the contact information of the host, rather than other participants.

SUMMARY

Embodiments of the present invention disclose a method, system, and computer program product for distributing user contact information. A computer receives the contact information associated with one or more users and stores said contact information in a contact information database. The computer detects a conference call and determines which users are present at the conference call. The computer further determines whether the users already share contact information with one another. Based on determining that the users do not already share contact information with one another, the computer determines whether contact information of a user should be distributed based on usage patterns of the user. Based on determining that contact information of the user should not be distributed based on usage patterns, the computer is further capable of determining whether the user would like to share contact information with other participating users via user input. Based on determining that the first user would like to share their contact information with other participating users, the computer provides the other participating users access to the contact information of the first user.

DETAILED DESCRIPTION

Embodiments of the present invention will now be described in detail with reference to the accompanying figures.

Figure 1:
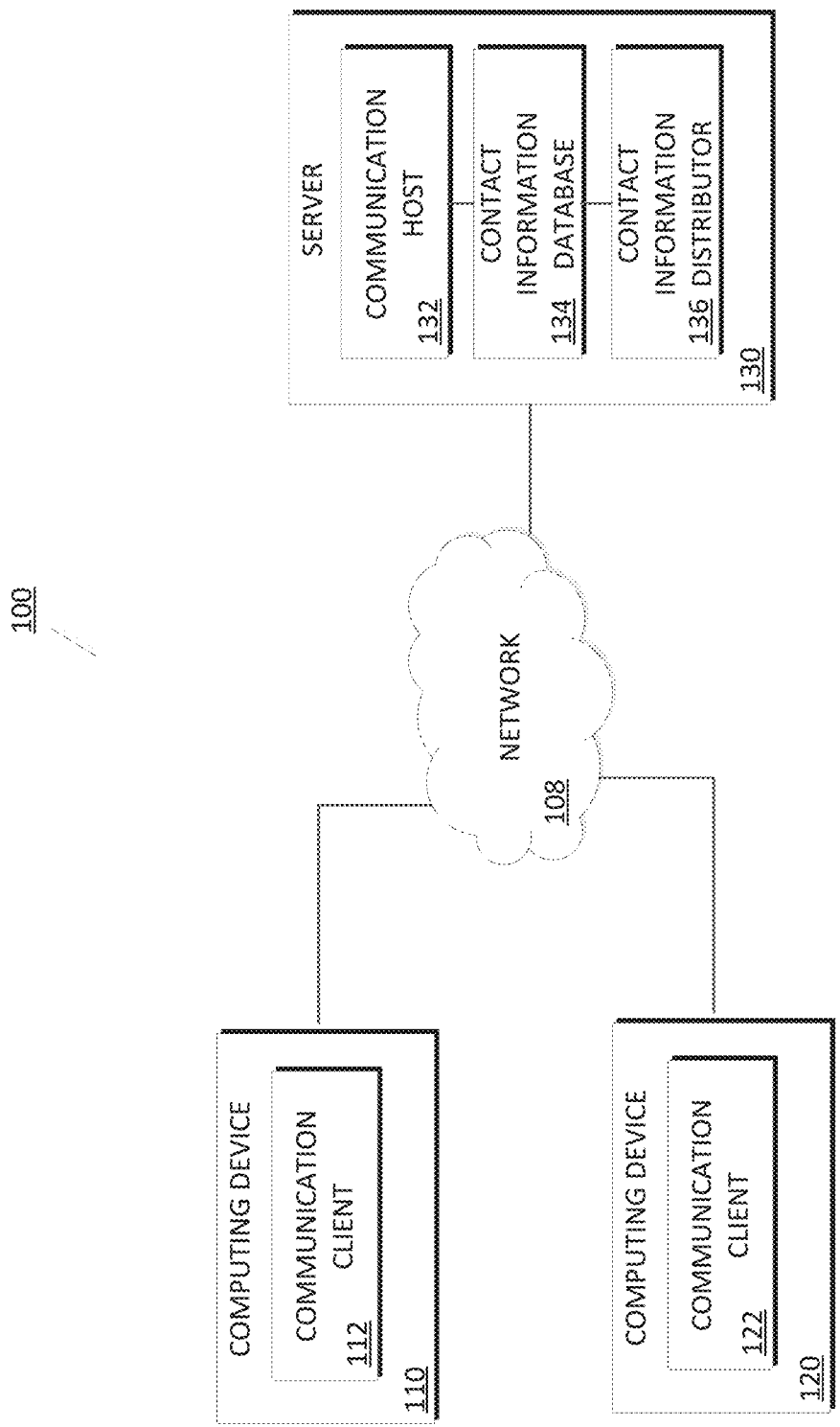
FIG. 1 illustrates a contact information distributing system, in accordance with an embodiment of the invention.

FIG. 1 illustrates a contact information distributing system 100, in accordance with an embodiment of the invention. In the illustrated embodiment, contact information distributing system 100 includes computing device 110, computing device 120, and server 130, all of which are interconnected over network 108.

In the illustrated embodiment, network 108 may be the Internet, representing a worldwide collection of networks and gateways to support communications between devices connected to the Internet. Network 108 may include, for example, wired, wireless, or fiber optic connections. In other embodiments, network 108 may be implemented as an intranet, a local area network (LAN), or a wide area network (WAN). In general, network 108 can be any combination of connections and protocols that will support communications between computing device 110, computing device 120, and server 130.

In the example embodiment, computing device 110 includes communication client 112. In the example embodiment, computing device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 4.

In the example embodiment, communication client 112 is a computer program on computing device 110 capable of transmitting and receiving information over a communication channel, such as network 108, between devices, such as computing device 110 and server 130. In the example embodiment, communication client 112 is capable of transmitting and receiving bi-directional transmissions (two-way) as well as multicast transmissions (chat room). Furthermore, communication client 112 is capable of transmitting and receiving both audio and video communications as well as supporting file transfers, hyperlinks, and other data transfers. In the example embodiment, communication client 112 acts as a client in a client-server based system where a central server retransmits data between users. In such embodiments, a participant utilizing communication client 112 transmits data to a host central server, such as the server 130, which then retransmits communications to the other participants on respective client devices, such as computing devices 120. In the example embodiment, communication client 112 communicates with other users via a network. In other embodiments, communication client 112 may communicate via other communication channels, such as a modem, land line, mobile phone, satellite phone, local area network, wide area network, a Bluetooth connection, a Wi-Fi connection, or any combination thereof.

In the example embodiment, computing device 120 includes communication client 122. In the example embodiment, computing device 120 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 120 is shown as a single device, in other embodiments, computing device 120 may be comprised of a cluster or plurality of computing devices, working together or working separately. Computing device 120 is described in more detail with reference to FIG. 4.

In the example embodiment, communication client 122 is a computer program on computing device 120 capable of transmitting and receiving real-time messages and information over a communication channel, such as network 108, between devices, such as computing device 120 and server 130. In the example embodiment, communication client 122 is capable of transmitting and receiving bi-directional transmissions (two-way) as well as multicast transmissions (chat room). In addition to transmitting text, hyperlinks, and images, communication client 122 is further capable of transmitting other data transfers such as audio and video files. In the example embodiment, communication client 122 acts as a client in a client-server based system where a central server retransmits data between users. In such an embodiment, a participant utilizing communication client 122 transmits data to a host central server, such as the server 130, which then retransmits communications to the other participants on respective client devices, such as computing device 110. While, in the example embodiment, communication client 122 communicates with other users via a network, in other embodiments, communication client 122 may communicate via other communication channels, such as a modem, land line, mobile phone, satellite phone, local area network, wide area network, a Bluetooth connection, a Wi-Fi connection, or any combination thereof.

In the example embodiment, server 130 includes communication host 132, contact information database 134, and contact information distributor 136. In the example embodiment, server 130 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While server 130 is shown as a single device, in other embodiments, server 130 may be comprised of a cluster or plurality of computing devices, working together or working separately. Server 130 is described in more detail with reference to FIG. 4.

In the example embodiment, communication host 132 is a computer program on server 130 capable of hosting data transfer over a communication channel, such as network 108, between devices, such as computing device 110 and computing device 120. In the example embodiment, communication host 132 is capable of hosting the transmission and receipt of bi-directional transmissions (two-way) as well as multicast transmissions (chat room). In addition to hosting the transmission of text, hyperlinks, and images, communication host 132 is further capable of hosting the transmission of other data transfers, such as audio and video files. In the example embodiment, communication host 132 acts as a host in a client-server based system where a central host server retransmits data between client users. In such an embodiment, a host central server, such as the server 130, receives and retransmits communications received from participants on respective client devices, such as computing devices 110 and 120. In other embodiments, the responsibilities of communication host 132 may be fulfilled by a human host/moderator rather than the central server described above. In the example embodiment, communication host 132 connects to other users via a network. In other embodiments, communication host 132 may host communications via other communication channels, such as a modem, land line, mobile phone, satellite phone, local area network, wide area network, a Bluetooth connection, a Wi-Fi connection, or any combination thereof.

In the example embodiment, contact information database 134 is a collection of organized data which details the contact information of one or more users participating in a conference call, such as a conference call between the users of computing devices 110 and 120. In the example embodiment, information detailed by contact information database 134 includes relevant contact information useful for reaching a user, such as the name, email address, internet protocol (IP) address, mailing address, telephone number, geographic location, time zone, building, office, and device type of the user. Furthermore, contact information database 134 additionally contains user usage patterns which detail conference calls attended by the user and contact information distribution at said conference calls. In the example embodiment, contact information database 134 is located on server 130. In other embodiments, however, contact information database 134 may be stored elsewhere, such as on computing devices 110 and/or 120.

In the example embodiment, contact information distributor 136 is a program capable of receiving the contact information of users participating in a multi-person conference call, such as the users of communication clients 112 and 122. Contact information distributor 136 is additionally capable of storing the received user contact information in a user contact information database, such as contact information database 134. Contact information distributor 136 is further capable of detecting a conference call, such as a conference call hosted by communication host 132, and determining the identity of the participants of the conference call. Contact information distributor 136 is further capable of determining whether the identified users already share contact information and, if not, determining whether a usage pattern is applicable to the situation. If a usage pattern is not applicable to the situation, contact information distributor 136 is capable of determining whether the participants of the conference call wish to share contact information via user input. Based on determining that a participant of the conference call would like to share contact information, contact information distributor 136 is further capable of providing other participants of the conference call access to the contact information of the participant. Contact information distributor 136 is lastly capable of collecting usage patterns from one or more conference calls.

Figure 2:
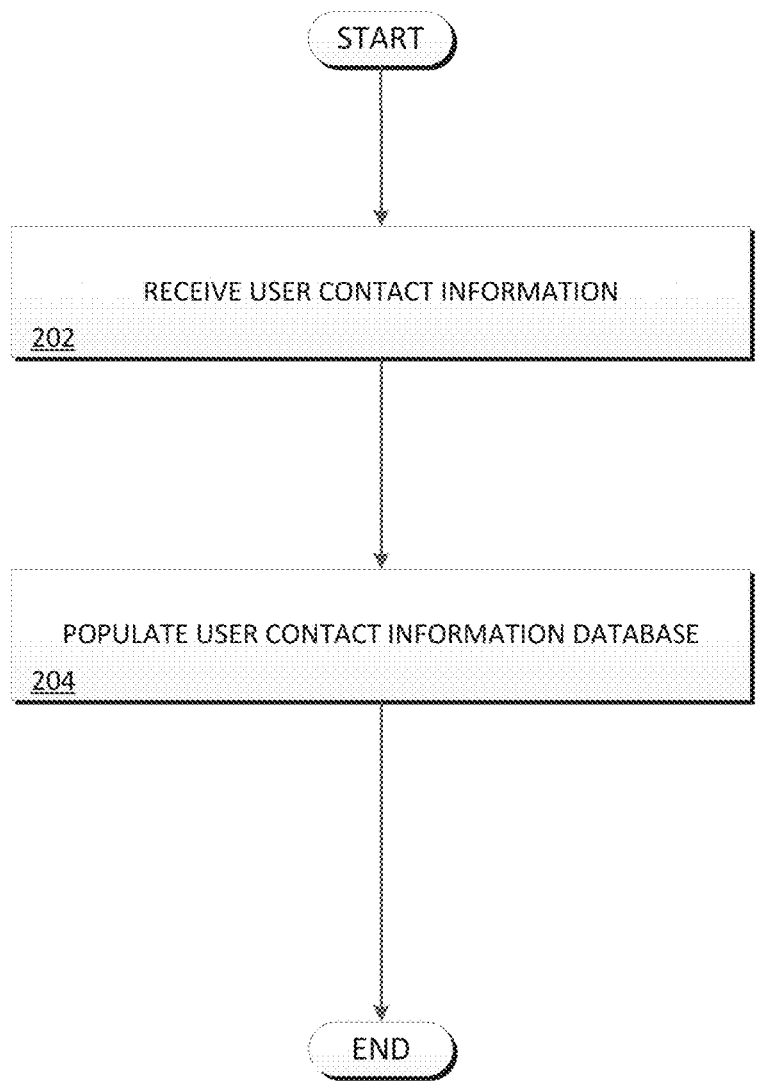
FIG. 2 is a flowchart illustrating the configuration of a contact information distributor of FIG. 1, in accordance with an embodiment of the invention.

FIG. 2 is a flowchart depicting the operation of contact information distributor 136 of FIG. 1 in receiving the contact information of users participating in a conference call.

Contact information distributor 136 receives user contact information (step 202). In the example embodiment, a user of computing device 110 enters corresponding contact information into a user interface of communication client 112 before it is transferred to communication host 132 via network 108. Contact information distributor 136 then retrieves the contact information via integration with communication host 132. In other embodiments, contact information distributor 136 may receive user contact information via reference to a database or other user input. In the example embodiment, the extent of input user information is dependent on the nature of the conference call or/or business field. Such contact information may include a name, email address, internet protocol (IP) address, mailing address, telephone number, geographic location, time zone, building, office, and device type/serial number of the user. For example, user Alpha enters a user input detailing his work email address, work phone number, work geographic location, work building, work office number, home address, and cell phone number within communication client 112 on computing device 110. Contact information distributor 136 receives the work email address, work phone number, work geographic location, work building, work office number, home address, and cell phone number of user Alpha via integration with communication client 112.

Contact information distributor 136 stores the received user contact information in a user contact information database (step 204). In the example embodiment, contact information distributor 136 stores the contact information of users participating in the conference call locally in contact information database 134 on server 130. In other embodiments, contact information database 134 may be stored elsewhere. In the example embodiment, the contact information input by a user may be organized into tiers based on the privacy associated with the contact information. In such an embodiment, higher tiers may be associated with more private contact information, while lower tiers may be associated with less private contact information. This feature may be advantageous when a user wishes to distribute only contact information associated with a specific privacy level. For example, tier 1 contact information may be associated with the most private information of a user and include contact information such as a cell phone number or home address. Conversely, tier 3 contact information may be associated with the least private information of a user and include contact information such as a work phone number or work location.

In the example embodiment, tiers associated with contact information may be designated by the user upon user input of the contact information or left blank for contact information distributor 136 to determine (step 204 cont'd). In the example embodiment, contact information distributor 136 determines the privacy level of received contact information via means such as natural language processing, optical character recognition (OCR), word/synonym matching techniques, referencing a database/directory, or a combination thereof. For example, contact information distributor 136 may detect which input fields have received input, such as a home address and a work address, then reference a database detailing the privacies associated with user contact information to determine that a home address is considered more private than a work address. Continuing the example above where Alpha inputs multiple forms of contact information into communication client 112, if contact information distributor 136 references a database to determine privacy levels associated with the aforementioned forms of contact information, then contact information distributor 136 determines that a work email address, work phone number, and work geographic location are the least private contact information entered by user Alpha. Contact information distributor 136 then stores the work email address, work phone number, and work geographic location of user Alpha in contact information database 134 as tier 3 contact information. Referring again to the example above, if contact information distributor 136 references the database to determine that a work building and work office number are moderately private contact information, then contact information distributor 136 stores the work building and work office number of user Alpha in contact information database 134 as tier 2 contact information. Lastly, if contact information distributor 136 references the same database to determine that the home address and cell phone number of user Alpha are considered the most private information of user Alpha, then contact information distributor 136 stores the home address and cell phone number of user Alpha in contact information database 134 as tier 1 contact information.

Figure 3:
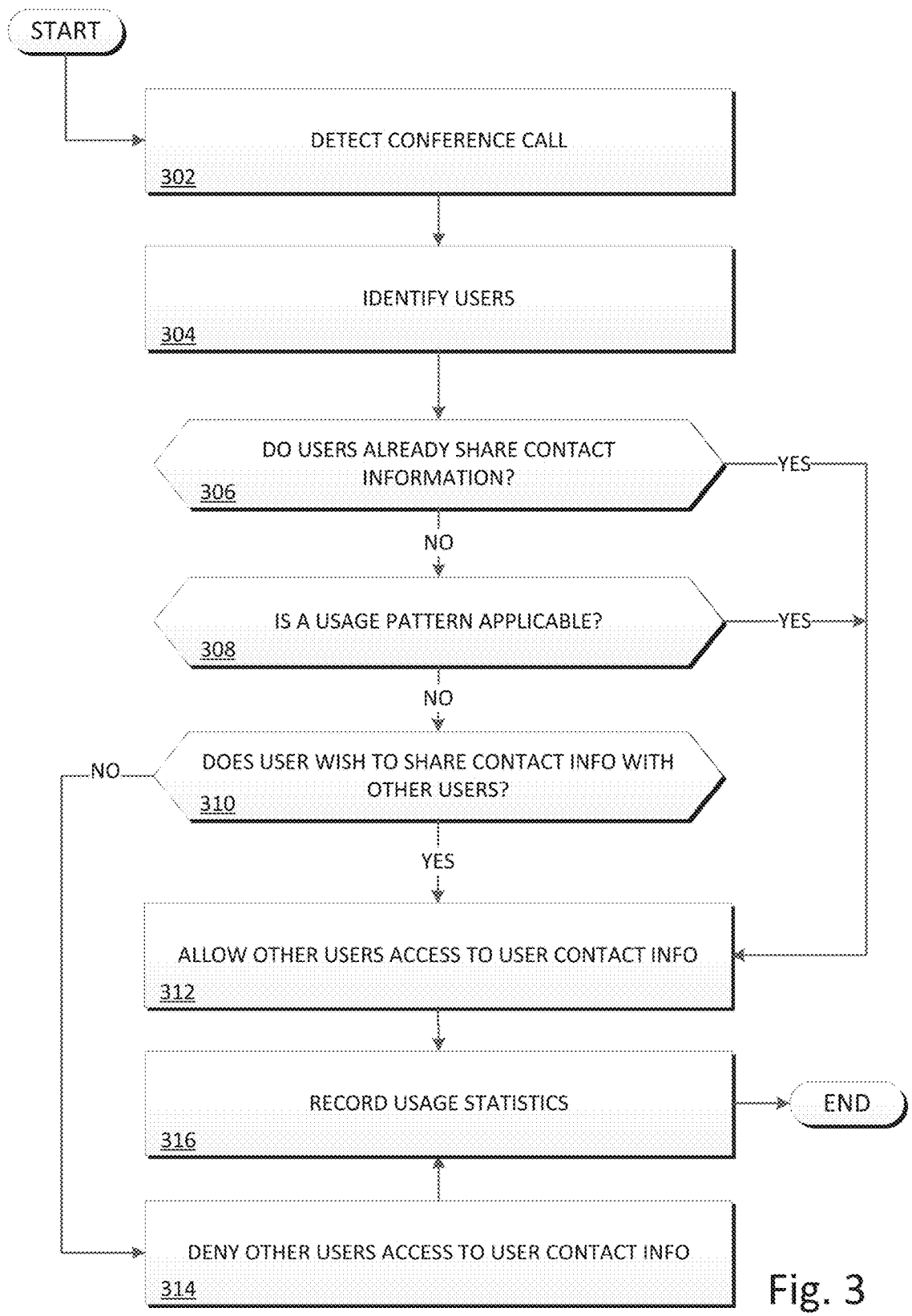
FIG. 3 is a flowchart illustrating the operations of the contact information distributor of FIG. 1 in distributing the contact information of users participating in a multi-person conference call, in accordance with an embodiment of the invention.

FIG. 3 is a flowchart depicting the operations of contact information distributor 136 in determining whether to distribute the contact information of users participating in a conference call, according to an embodiment of the present invention.

Contact information distributor 136 detects a conference call (step 302). In the example embodiment where contact information distributor 136 is integrated with communication host 132, contact information distributor 136 detects a conference call via network 108 and integration with communication host 132. In the example embodiment, contact information distributor 136 communicates with communication host 132 to determine whether communication client 112/122 has received user input to join a conference call. In other embodiments, however, contact information distributor 136 may utilize other techniques to detect the initiation of a conference call, such as monitoring communication channels on computing devices with installed communication clients for audio and/or video transfer. Continuing the example above, if user Alpha, using communication client 112 on computing device 110, joins a conference call with user Beta, using communication client 122 on computing device 120, then contact information distributor 136 communications with communication host 132 to detects the conference call between users Alpha and Beta.

Contact information distributor 136 identifies the users participating in the conference call (step 304). In the example embodiment, contact information distributor 136 identifies users participating in the conference call via integration with communication host 132. Such integration allows contact information distributor 136 to determine, as the conference call is initiated, an identifier associated with the user, such as an account (username, etc.), a device (touchtone phone, laptop, etc.), and/or a communication channel (landline telephone, Ethernet connection, etc.). Based on the determined identifier, contact information distributor 136 then identifies a characteristic associated with one of the aforementioned identifiers, such as an account username, a device serial number, a telephone number associated with the telephone line, and/or an Internet Protocol (IP) address associated with the Ethernet connection. In the example embodiment, contact information distributor 136 retrieves information such as a username by referencing a log associated with the users who have logged in to communication client 112. In addition, contact information distributor 136 retrieves other information, such as an associated IP address, telephone number, or device serial number, by communicating with the operating system of computing device 110.

Having identified a characteristic associated with the user, contact information distributor 136 then attempts to identify the user by cross-referencing the identified characteristic(s) with information contained in contact information database 134 (step 304 cont'd). For example, this may include comparing a username with which a user logged in with a registry of registered users and corresponding usernames. Similarly, device serial numbers, telephone numbers, and IP addresses may be compared to the device serial numbers and IP addresses configured by the user in step 202 during contact information input. Contact information distributor 136 repeats this process for each user within the conference call. In the case that contact information distributor 136 is not able to identify a user, perhaps because the user is utilizing a different account, device, location, etc., a temporary file is created for each unknown participant which can be later tied to a specific participant if desired. Continuing the example above detailing user Alpha conferencing with user Beta, if both Alpha and Beta are utilizing communication clients 112 and 122 on laptops, respectively, then contact information distributor 136 communicates with computing devices 110 and 120 to identify IP addresses associated with computing devices 110 and 120. Contact information distributor 136 then compares the identified IP addresses to those saved in contact information database 134 and, because Alpha has previously input contact information in step 202, determines the identity of the user of computing device 110 as Alpha. Although contact information distributor 136 does not determine the identity of Beta because Beta has not input contact information into contact information database 134, contact information distributor 136 creates a temporary record for Beta and associates the temporary record with the IP address associated with user Beta.

Contact information distributor 136 determines whether a first participant of the conference call is currently sharing contact information with other participants (decision 308). In the example embodiment, contact information distributor 136 determines whether fellow participants are already provided access to the contact information of a first participant by referencing the usage statistics associated with the first participant. Based on the usage statistics of the first participant, contact information distributor 136 is capable of determining whether the first participant provided any other participants at the conference call access to corresponding contact information. For example, contact information distributor 136 references the usage statistics of user Alpha to determine whether user Alpha has been in a conference call with user Beta and, if so, determines whether user Alpha has already provided user Beta access to contact information associated with Alpha. In other embodiments, contact information distributor 136 may determine whether contact information associated with a first participate is already shared between users by referencing the contact list of the other participants, however this method requires that contact information distributor 136 has access to contacts lists. As such, this method may not be applicable to basic devices and may be bypassed in such circumstances. Continuing the example above, contact information distributor 136 references the usage statistics of user Alpha to determine whether user Alpha has provided corresponding contact information to user Beta in previous interactions.

If contact information distributor 136 determines that the contact information of the first participant is already shared with other participants of the conference call (decision 308 "YES" branch), then contact information distributor 136 allows participants access to the contact information in accordance with the usage statistics (step 312). Continuing the example above, if contact information distributor 136 references usage statistics of user Alpha to determine that user Beta has already provided user Beta access to tier 1 contact information of user Alpha, then contact information distributor 136 makes no change to user Betas access to tier 1 contact information of user Alpha. In the example embodiment, a participant need only have access to one form/tier of contact information associated with the user to satisfy decision 306. In other embodiments, however, contact information distributor 136 may be configured to determine whether participants have all forms/tiers of contact information associated with a user and, if not, proceed to decision 306 "NO" branch.

If contact information distributor 136 determines that the contact information of the first participant is not distributed to other participants of the conference call (decision 308 "NO" branch), then contact information distributor 136 determines whether a usage pattern is applicable (decision 308). Usage patterns are collected from participants at each conference call to identify user patterns in distributing contact information. In the example embodiment, usage patterns include the time/date of the conference, duration of the conference, location of the participants participating in the conference, networks used to access the conference, participants at the conference, seniority level of participants at the conference, contact information access provided to the participants, and any other available information detailing the specific circumstances in which the conference took place. Based on identified usage patterns, a user may configure contact information distributor 136 to automatically distribute contact information at the current conference call if the current conference call exhibits a strong enough similarity factor to those detailed in the usage patterns.

Such usage patterns are stored in association with each participant within contact information database 134 according to one or more similarities, such as co-participants, times of day, days of the week, duration, etc. can be catalogued and analyzed (decision 308 cont'd). The analyzed one or more similarities are then processed (added, averaged, adjusted, normalized, etc.) and compared to the current conference call to determine a similarity factor. If the similarity factor exceeds a defined threshold, the contact information distribution exhibited by the usage pattern may be implemented in the current conference call, eliminating the need to prompt a user selection to distribute contact information. Continuing the example above, if user Alpha consistently distributes tier 3 contact information to new participants of a conference call on Thursdays, contact information distributor 136 identifies a usage pattern in which Alpha is likely to distribute tier 3 contact information to new participants in Thursday conference calls. Similarly, if Alpha tends to distribute tier 3 contact information to new participants at 3:00 PM conference calls, then contact information distributor 136 identifies a usage pattern in which Alpha distributes tier 3 contact information at 3:00 PM. In addition, if Alpha tends to distribute tier 3 contact information to new participants of conference calls in which known users Charlie and Delta are present, contact information distributor 136 identifies a usage pattern in which Alpha is likely to distribute tier 3 contact information to new participants in conference calls attended by Charlie and Delta.

Therefore, continuing the example above, if contact information distributor 136 identifies Alpha, Beta, Charlie, and Delta in a Thursday conference call at 3:00 PM, contact information distributor 136 references usage patterns of user Alpha to determine that a usage pattern is applicable and distributes tier 3 contact information to new participant, Beta. The similarity factor may be scaled and weighed such that slight differences in conference calls still carry some weight while direct similarities between conferences carry greater weight. Continuing the 3:00 PM Thursday conference call example above where a 3:00 PM usage pattern is identified, if a current conference call starts at 3:15 PM instead of 3:00 PM, the corresponding similarity factor may be less than that of a conference call that starts at 3:05 PM. Similarly, if only Alpha, Charlie, and Beta are participating in the Thursday conference call at 3:00 PM, the similarity factor would be less than that of a meeting at 3:00 PM on Thursday in which Alpha, Beta, Charlie, and Delta are present. Similar determinations may be made in regards to other similarities, such as a location of the participants. Locations of the participants may be determined by referencing a global positioning system (GPS) module within computing device 110 or 120 or identifying a network/area code used by the participants to connect to the conference call. In the example embodiment, if multiple usage patterns/distributions conflict based on the circumstances of a particular conference call, contact information distributor 136 applies the contact information distribution from the usage pattern which exhibits a higher similarity factor. In other embodiments, conflictions in usage patterns/distributions may be resolved by prompting a user selection (described in greater detail below).

If contact information distributor 136 determines that a usage pattern is applicable (decision 308 "YES" branch), then contact information distributor 136 distributes the contact information of the user in accordance with the usage pattern (step 312). Continuing the example above (where the identified usage patterns of Alpha is distributing tier 3 contact information to new participants at conference calls on Thursdays at 3:00 PM with co-participants Charlie and Delta), if contact information distributor 136 identifies Alpha, Beta, Charlie, and Delta in a Thursday conference call at 3:00 PM, contact information distributor 136 references usage patterns of user Alpha to determine, via a similarity factor, that a usage pattern is applicable and distribute tier 3 contact information to new participant, Beta.

If contact information distributor 136 determines that a usage pattern is not applicable (decision 308 "NO" branch), then contact information distributor 136 prompts a user selection of whether to distribute contact information to the other users (decision 310). In the example embodiment, contact information distributor 136 determines whether a user wishes to share their contact information with other participating users via user input into communication client 112/122. Such user input may include selecting a button, toggling a switch, speaking a phrase, performing a gesture, or other action detectable by computing device 110/120. In the example embodiment, the means of selecting contact information distribution options and the time at which the user selects whether to distribute contact information is largely dependent on the mode of communication (audio vs. video call) and complexity of the device(s) (for example, rotary phone vs. smartphone/computing device with an electronic display). In the example embodiment, contact information distributor 136 determines the complexity of the device utilized by users participating in the conference call by communicating with the operating system of the device or by referencing a user input detailing the device in the user input of step 202.

In telephonic conference calls on basic telephones, for example a rotary phone, contact information distributor 136 may prompt a participating user when joining a conference call (or at a later time) to select specific digits on their rotary phone corresponding to an option to share some/all contact information with any/all participants (decision 310 cont'd). Continuing the example above with users Alpha and Beta, if user Alpha is utilizing a rotary phone (rather than a laptop), then contact information distributor 136 prompts user Alpha upon joining a conference call to select digit 7 if user Alpha would like to distribute tier 3 contact information to co-participants, select digit 8 to distribute tier 2 contact information, select digit 9 to distribute tier 1 contact information, or select digit 0 to not distribute any contact information. Furthermore, contact information distributor 136 may be configured to prompt a similar digit selection process as above for distributing tier 1, 2, or 3 contact information to each participant of the conference call, rather than a single selection corresponding to all participants. In addition, such a user selection may also be prompted as more participants join/leave the conference call. Furthermore, a specific digit, such as digit 1, may be selected by a user to re-prompt distribution options should a user later decide to share/revoke contact information.

Conversely, in telephone/video calls on more advanced computing devices, such as a smart phone or laptop, the conference call interface of communication client 112/122 may incorporate selectable options for sharing contact information throughout the entirety of the conference call (decision 310 cont'd). In addition, such interfaces may be configured to allow a user to select specific participants of the conference call for which to share contact information while excluding others. For example, the interface of communication client 112/122 may display a toggle switch corresponding to each participant in the conference call indicating whether contact information corresponding to the user is distributed to the listed participants. Furthermore, in the example embodiment, contact information distributor 136 may be configured to allow the user to select which tiers, or individual forms, of contact information is shared with other participants of the conference call. For example, the interface of communication client 112/122 may include a table displaying conference call participants on a y-axis, tiers of contact information on an x-axis, and a toggle switch corresponding to a user selection in the cell associated with each row and column. Continuing the conference call example above, if user Alpha would only like to share tier 3 contact information with user Beta, then Alpha toggles a switch to the "yes/on" position which corresponds to both user Beta and tier 3 contact information of user Alpha. Furthermore, Alpha similarly toggles the switches corresponding to user Beta, tier 2 contact information of user Alpha, and tier 1 contact information of user Alpha to the "no/off" position.

If contact information distributor 136 determines that the first participant wishes to share their contact information with other participants in the conference call (decision 310 "YES" branch), then contact information distributor 136 provides selected participants access to the contact information of the user (step 312). Like the determination of whether a first user wishes to share corresponding contact information made above, the means for sharing contact information of a user is largely dependent on the complexity of the device utilized by the participants of the call. In embodiments utilizing basic telephones, such as rotary phones, linked digital contact lists are often unavailable. Therefore, sharing the contact information of the first participant is accomplished by means such as transmitting the corresponding contact information to other participants via email, text, push notification, mail/letter, or telephone. In such embodiments, contact information distributor 136 may be configured by a participant to receive contact information of other users in a prescribed manner, such as receiving the contact information via the registered email address of the participant or push notification to a desired device. Continuing the conference call example above with users Alpha and Beta utilizing rotary phones, if user Alpha selects digit 7 to distribute tier 3 contact information to user Beta and user Beta has configured contact information distributor 136 to receive shared contact information via email, then contact information distributor retrieves the tier 3 contact information of user Alpha from contact information database 134 and transmits them via email to the registered email of user Beta.

Similarly, contact information distributor 136 may transmit to the participant the location and/or temporary authentication credentials in order to manually retrieve the contact information of the first participant from contact information database 134 (step 312 cont'd). Continuing the conference call example above with users Alpha and Beta utilizing rotary phones, if user Alpha selects digit 7 to distribute tier 3 contact information to user Beta and user Beta has configured contact information distributor 136 to receive contact information via manual retrieval, then contact information distributor 136 transmits to Beta a temporary username and password which provides access to tier 3 contact information corresponding to user Alpha in contact information database 134. In such embodiments, the temporary authentication credentials may be revoked after a period of time, such as an hour or a week.

In embodiments utilizing more complex computing devices, distributing contact information may be performed alternatively (step 312 cont'd). In the example embodiment where users participating in the conference call communicate via communication clients 112 and 122, the contact list of each user is maintained through communication host 132. As such, contact information distributor 136 shares user contact information by allowing/denying user's access to the contact information of users within contact information database 134. In the example embodiment, contact information distributor 136 allows/denies a user access to contact information within contact information database 134 by storing contact information permissions associated with the other participants. Contact information distributor 136 then references said permissions on a periodic basis, such as each time the user opens communication client 112, a daily/hourly basis, or upon detection of an alteration to the permissions associated with the user. Based on the stored permissions associated with the user, contact information distributor 136 then loads within communication client 112 the contact information of other participants to which the user is granted access.

Continuing the example above where user Alpha selects to share tier 3 contact information with user Beta, if user Beta opens communication client 122, then contact information distributor 136 references the permissions associated with user Beta to determine that Beta is granted access to tier 3 contact information of user Alpha. Contact information distributor 136 then loads the tier 3 contact information of user Alpha, including a work email address, work telephone number, and work geographic location, within communication client 122 of user Beta. Once contact information is saved, contact information distributor 136 may suggest/auto fill user contact information for the participant in specific situations, such as detecting the input of one or more letters starting the name of the user or speech recognition of the name of the user. In the example above, if user Beta opens a contacts list in communication client 122 and begins to type in the name of user Alpha, then the contact information distributor 136 suggests the contact information of user Alpha. Similarly, if Beta begins typing the work telephone number of Alpha, contact information distributor 136 suggests the remaining digits of the work telephone number corresponding to Alpha.

If contact information distributor 136 determines that the user does not wish to share corresponding contact information with other users participating in the conference call (decision 310 "NO" branch), then contact information distributor 136 denies selected users access to the contact information of the user (step 314). In the example embodiment where users participating in the conference call communicate via communication host 132, the contact list of each user is maintained through communication host 132. Therefore, denying users access to the contact information of others involves denying users access to contact information database 134. Continuing the example above, if user Alpha would not like to share tier 3 contact information with user Beta, then contact information distributor 136 denies user Beta access to the registered phone number, email address, and geographic location of user Alpha. Similarly, in other embodiments where contact information is transmitted to a user, contact information distributor 136 denies the user access to the contact information corresponding to other participant(s) by not transmitting the contact information of the other participant(s) to the user.

Contact information distributor 136 records usage statistics detailing the conference call (step 316). In the example embodiment, recorded usage statistics include the time/date of the conference, duration of the conference, location of the participants within the conference, networks used to access the conference, participants at the conference, seniority level of participants at the conference, contact information access provided to the participants, and any other information detailing the specific circumstances in which the conference took place. Usage statistics are utilized in decision 308 in which contact information distributor 136 determines whether a similarity factor between the current conference call and those detailed by the usage statistics exceed a threshold similarity. In the example embodiment, usage patterns are stored in association with users within contact information database 134. In other embodiments, usage patterns may be stored elsewhere, locally or remote.

Figure 4:
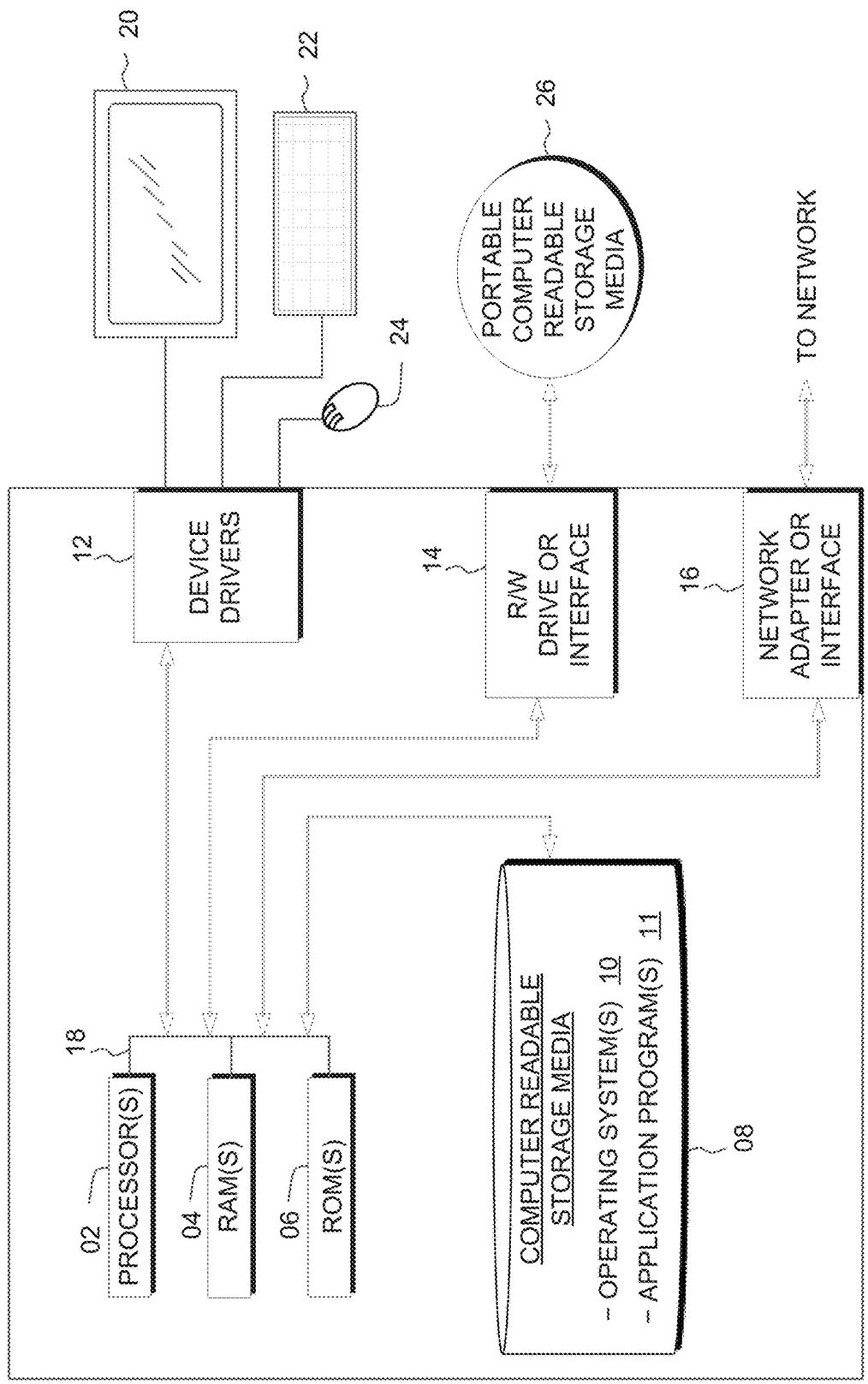
FIG. 4 is a block diagram depicting the hardware components of the contact information distributing system of FIG. 1, in accordance with an embodiment of the invention.

FIG. 4 depicts a block diagram of components of computing device 110 of a contact information distributing system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example, contact information distributor 136, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 14 to read from and write to one or more portable computer readable storage media 26. Application programs 11 on computing device 110 may be stored on one or more of the portable computer readable storage media 26, read via the respective R/W drive or interface 14 and loaded into the respective computer readable storage media 08.

Computing device 110 may also include a network adapter or interface 16, such as a TCP/IP adapter card or wireless communication adapter (such as a 4G wireless communication adapter using OFDMA technology). Application programs 11 on computing device 110 may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for distributing user contact information within a conference call, the method comprising:
   detecting initiation of a conference call based on receiving one or more requests to join the conference call;
   identifying a first characteristic associated with a first request received from a first device of the one or more requests to join the conference call, wherein the first characteristic is at least one of a username, a telephone number, a device MAC address, or a device IP address;
   determining that the first characteristic is associated with a first user;
   based on determining that the first characteristic is associated with the first user, identifying contact information associated with the first user, wherein the contact information includes at least one of a name, email address, internet protocol (IP) address, mailing address, telephone number, geographic location, time zone, building, office, and device type of the first user;
   determining whether to distribute the contact information associated with the first user to a second user based on determining whether one or more current similarity factors of one or more current usage patterns exceeds a threshold similarity to one or more historical similarity factors of one or more historical usage patterns; and
   based on determining to distribute the contact information associated with the first user to the second user, transmitting the contact information associated with the first user to the second user.

2. The method of claim 1, wherein determining whether to distribute the contact information associated with the first user to the second user is further based on determining whether the second user already has access to the contact information associated with the first user.

3. The method of claim 1, wherein the one or more current usage patterns include a day, a time, a duration, one or more participant locations, one or more participant networks, one or more participant seniority levels, and previously allowed participant contact information access.

4. The method of claim 1, further comprising:
   determining one or more privacy levels of the contact information; and
   wherein providing the second user the contact information associated with the first user is further based on the determined one or more privacy levels.

5. The method of claim 4, further comprising:
   determining a type of device corresponding to the first user;
   based on determining that the type of device corresponding to the first user includes an electronic display, displaying to the first user one or more visual options corresponding to the one or more privacy levels with respect to the second user; and
   based on determining that the type of device corresponding to the first user does not include the electronic display, playing to the first user an audio recording of one or more audio options corresponding to the one or more privacy levels with respect to the second user.

6. The method of claim 1, wherein the one or more current similarity factors are at least one of weighted, averaged, and normalized.

7. The method of claim 1, further comprising:
   storing the one or more current usage patterns in association with the first user.

8. A computer program product for distributing user contact information within a conference call, the computer program product comprising:
   one or more non-transitory computer-readable storage media and program instructions stored on the one or more computer-readable storage media, the program instructions causing one or more processors to perform a computer implemented method comprising:
   detecting initiation of a conference call based on receiving one or more requests to join the conference call;
   identifying a first characteristic associated with a first request received from a first device to join the conference call, wherein the first characteristic is at least one of a username, a telephone number, a device MAC address, or a device IP address;
   determining that the first characteristic is associated with a first user;
   based on determining that the first characteristic is associated with the first user, identifying contact information associated with the first user, wherein the contact information includes at least one of a name, email address, internet protocol (IP) address, mailing address, telephone number, geographic location, time zone, building, office, and device type of the first user;
   determining whether to distribute the contact information associated with the first user to a second user based on determining whether one or more current similarity factors of one or more current usage patterns exceeds a threshold similarity to one or more historical similarity factors of one or more historical usage patterns; and
   based on determining to distribute the contact information associated with the first user to the second user, transmitting the contact information associated with the first user to the second user.

9. The computer program product of claim 8, wherein determining whether to distribute the contact information associated with the first user to the second user is further based on determining whether the second user already has access to the contact information associated with the first user.

10. The computer program product of claim 8, wherein the one or more current usage patterns include a day, a time, a duration, one or more participant locations, one or more participant networks, one or more participant seniority levels, and previously allowed participant contact information access.

11. The computer program product of claim 8, further comprising:
    determining one or more privacy levels of the contact information; and
    wherein providing the second user the contact information associated with the first user is further based on the determined one or more privacy levels.

12. The computer program product of claim 11, further comprising:
    determining a type of device corresponding to the first user;
    based on determining that the type of device corresponding to the first user includes an electronic display, displaying to the first user one or more visual options corresponding to the one or more privacy levels with respect to the second user; and
    based on determining that the type of device corresponding to the first user does not include the electronic display, playing to the first user an audio recording of one or more audio options corresponding to the one or more privacy levels with respect to the second user.

13. The computer program product of claim 11, wherein the one or more current similarity factors are at least one of weighted, averaged, and normalized.

14. The computer program product of claim 11, further comprising:
    storing the one or more current usage patterns in association with the first user.

15. A computer system for distributing user contact information within a conference call, the computer system comprising:
    one or more computer processors, one or more computer-readable storage media, and program instructions stored on one or more of the computer-readable storage media for execution by at least one of the one or more processors, the program instructions, when executed by the at least one of the one or more processors, causing the computer system to perform a method comprising:
    detecting initiation of a conference call based on receiving one or more requests to join the conference call;
    identifying a first characteristic associated with a first request received from a first device to join the conference call, wherein the first characteristic is at least one of a username, a telephone number, a device MAC address, or a device IP address;
    determining that the first characteristic is associated with a first user;
    based on determining that the first characteristic is associated with the first user, identifying contact information associated with the first user, wherein the contact information includes at least one of a name, email address, internet protocol (IP) address, mailing address, telephone number, geographic location, time zone, building, office, and device type of the first user;
    determining whether to distribute the contact information associated with the first user to a second user based on determining whether one or more current similarity factors of one or more current usage patterns exceeds a threshold similarity to one or more historical similarity factors of one or more historical usage patterns; and
    based on determining to distribute the contact information associated with the first user to the second user, transmitting the contact information associated with the first user to the second user.

16. The computer system of claim 15, wherein determining whether to distribute the contact information associated with the first user to the second user is further based on determining whether the second user already has access to the contact information associated with the first user.

17. The computer system of claim 15, wherein the one or more current usage patterns include a day, a time, a duration, one or more participant locations, one or more participant networks, one or more participant seniority levels, and previously allowed participant contact information access.

18. The computer system of claim 15, further comprising:
    determining one or more privacy levels of the contact information; and
    wherein providing the second user the contact information associated with the first user is further based on the determined one or more privacy levels.

19. The computer system of claim 18, further comprising:
    determining a type of device corresponding to the first user;
    based on determining that the type of device corresponding to the first user includes an electronic display, displaying to the first user one or more visual options corresponding to the one or more privacy levels with respect to the second user; and
    based on determining that the type of device corresponding to the first user does not include the electronic display, playing to the first user an audio recording of one or more audio options corresponding to the one or more privacy levels with respect to the second user.

20. The computer system of claim 15, further comprising:
    storing the one or more current usage patterns in association with the first user.

* * * * *